United States Patent [19]
Watanabe et al.

[11] Patent Number: 5,513,025
[45] Date of Patent: Apr. 30, 1996

[54] IMAGE DISPLAY APPARATUS

[75] Inventors: Rikuji Watanabe; Katsuya Fujisawa; Ikuo Onishi, all of Kurashiki, Japan

[73] Assignee: Kuraray Co., Ltd., Kurashiki, Japan

[21] Appl. No.: 52,832

[22] Filed: Apr. 27, 1993

[30] Foreign Application Priority Data

| Apr. 28, 1992 | [JP] | Japan | 4-136312 |
| Apr. 29, 1992 | [JP] | Japan | 4-137931 |
| May 1, 1992 | [JP] | Japan | 4-139993 |
| Mar. 31, 1993 | [JP] | Japan | 5-074455 |
| Apr. 14, 1993 | [JP] | Japan | 5-087665 |

[51] Int. Cl.$^6$ .................. G02F 1/1335; G02F 1/137; G02B 27/46; G02B 5/18
[52] U.S. Cl. .............. 359/68; 359/562; 359/563; 359/569; 359/69; 359/95
[58] Field of Search .................. 359/68, 95, 69, 359/558, 562, 563, 566, 569

[56] References Cited

U.S. PATENT DOCUMENTS

| 3,914,761 | 10/1975 | Murase et al. | 359/558 |
| 4,998,800 | 3/1991 | Nishida et al. | 359/569 |
| 5,046,827 | 9/1991 | Frost et al. | 359/54 |

FOREIGN PATENT DOCUMENTS

| 0409188 | 1/1991 | European Pat. Off. |
| 4920105 | 5/1974 | Japan. |
| 3148622 | 6/1991 | Japan. |
| 1290577 | 9/1972 | United Kingdom. |

OTHER PUBLICATIONS

Patent Abstracts of Japan, vol. 15, No. 503, (P-1290) Dec. 19, 1991, JP-A-03 219 207, Sep. 26, 1991.
Patent Abstracts of Japan, vol. 9, No. 86, (P-349), Apr. 16, 1985, JP-A-59 214 825, Dec. 4, 1984.
SPIE vol. 679– Current Developments in Optical Engineering and Diffraction Phenomena, pp. 165–168, M. T. Gale, et al., "Diffractive Diffusers for Display Applications".

Primary Examiner—James B. Mullins
Assistant Examiner—Ron Trice
Attorney, Agent, or Firm—Oblon, Spivak, McClelland, Maier & Neustadt

[57] ABSTRACT

An image display apparatus includes an image display device such as, for example, a liquid crystal display panel, having a plurality of dot-shaped picture elements arranged in a two-dimensional pattern, and a diffraction grating disposed on an optical path through which imagewise rays of light emerging from the device travel. To minimize a reduction in quality and contrast of an image displayed by the device, the member has a spatial cut-off frequency chosen to be of a value lying between the sampling frequency, determined by the pitch between picture elements of the image display device, and the Nyquist frequency. For the same purpose, the intensity of ±1st order light relative to the intensity of 0-th order light in the diffraction grating is within the range of 60 to 80% at a center wavelength of the image display device, and the sum of the intensity of the 0-th order light and that of the ±1st order light relative to that of total diffracted light is equal to or higher than 80% at the center wavelength of the device.

8 Claims, 15 Drawing Sheets

FIG.15
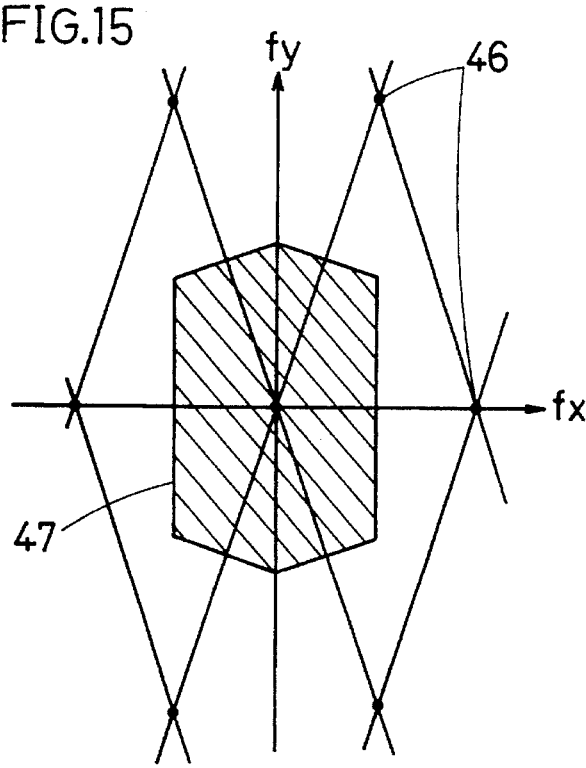
FIG.16
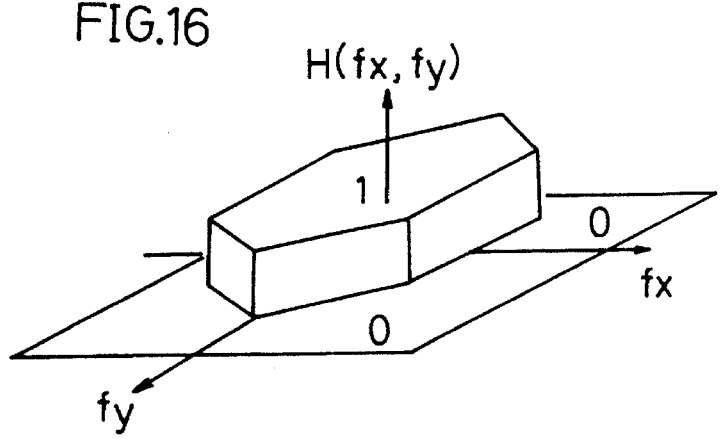
FIG.17
| R | G | B | R | G | B | R | G | B |
|---|---|---|---|---|---|---|---|---|
| B | R | G | B | R | G | B | R | G |
| G | B | R | G | B | R | G | B | R |
FIG.18
| G | B | G | B | G | B |
|---|---|---|---|---|---|
| R | G | R | G | R | G |
| G | B | G | B | G | B |
| R | G | R | G | R | G |
| G | B | G | B | G | B |
| R | G | R | G | R | G |

IMAGE DISPLAY APPARATUS

BACKGROUND OF THE INVENTION

1. Field of the Invention

The present invention relates to an image display apparatus such as, for example, a viewfinder or a projection-type video projector, which is equipped with an image display device of a matrix display system.

2. Description of the Prior Art

An image display apparatus equipped with an image display device (hereinafter referred to as a matrix display device) such as, for example, a liquid crystal display panel, capable of accomplishing a matrix display is generally so designed as to present a viewable image by selectively turning on a plurality of dot-like display segments. Where a particular color filter array is employed for each picture element of the matrix display device, a color image can be displayed.

As a specific example of the image display device capable of accomplishing a matrix display, reference will now be made to the liquid crystal panel. FIG. 29 illustrates a sectional representation of the standard transmission-type liquid crystal display panel 4 and FIG. 30 illustrates a plan view thereof. The liquid crystal display panel 4 includes a first transparent insulating substrate 11 having an inner surface formed with a plurality of transparent pixel electrodes 12 and a matrix array of switching electrodes such as thin-film transistors 13 which are non-linear elements and which are connected respectively with the pixel electrodes 12. The liquid crystal display panel 4 also includes, as shown in FIG. 30, a matrix array of source bus electrodes 14 and a matrix array of gate bus electrodes 15, both for supplying a voltage to sources and gates of the switching electrodes 13.

A second transparent insulating substrate 16 disposed in face-to-face relationship with the first transparent insulating substrate 11 has an inner surface deposited with a common electrode 17 and color filters 18a and 18b arranged in a pattern similar to the pattern of the pixel electrodes 12. The inner surface of the second transparent insulating substrate 16 is also formed with light shielding layers 19a and 19b corresponding in position to the switching electrodes 13 and the bus electrodes 14 and 15, respectively, each of the light shielding layers being disposed between each neighboring color filter 18a and 18b. A layer of liquid crystal 20 is sealed within a space delimited between the first and second transparent insulating substrates 11 and 16.

A first polarizing plate 21 is disposed on an exit side of the liquid crystal display panel 4, for example, on an outer surface of the first transparent insulating substrate 11, while a second polarizing plate 22 is disposed on an incident side of the liquid crystal display panel 4, for example, on an outer surface of the second transparent insulating substrate 16.

In the liquid crystal display panel 4 of the above described construction, since the switching electrodes 13 and the various bus electrodes 14 and 15 are opaque, no light passes therethrough. In other words, only areas surrounded by the bus electrodes 14 and 15 form light transmitting windows 23 and, of these light transmitting windows 23, only the areas excluding the switching electrodes 13, that is, only the pixel electrodes 12 and spaces surrounding the pixel electrodes 12, form effective areas through which light can pass. When the matrix display device represented by such a liquid crystal display panel is employed in a projection-type projector and an image is then projected by the projector on an enlarged scale or an image is then viewed through a viewfinder system on an enlarged scale, the picture elements tend to be visually noticeable in the form of a pattern of discontinuous dots and, therefore, the quality of the image projected or viewed is considerably reduced.

In view of the foregoing, and in order to minimize a reduction in image quality resulting from the presence of the switching electrodes 13 and the various bus electrodes 14 and 15, the Japanese Laid-open Patent Publication No. 3-148622, published Jun. 25, 1991 (claiming priority based on U.S. Ser. No. 382,514 filed Jul. 20, 1989) suggests the use of a diffraction grating disposed on a front side, i.e., a location closer to the viewer's eye, of the liquid crystal display panel to provide a blurring phenomenon in an optical system. However, this prior art technique has a problem in that, since no relationship among the spatial cut-off frequency, the Nyquist frequency and the sampling frequency is taken into consideration, the contrast of the image tends to be lowered thereby failing to provide a sensation to a high resolution.

SUMMARY OF THE INVENTION

The present invention is accordingly intended to provide an improved image display apparatus in which the possibility of the image being viewed as a pattern of discontinuous dots is minimized to provide a sensation of a high resolution.

To this end, according to a first preferred embodiment of the present invention, there is provided an image display apparatus which comprises an image display device including a plurality of dot-shaped picture elements arranged in a two-dimensional pattern, and a diffraction grating disposed on an optical path through which imagewise rays of light emerging from the image display device travel. In this apparatus, the diffraction grating has a spatial cut-off frequency which is chosen to lie between the Nyquist frequency, determined by an interval between the picture elements in the image display device, and a sampling frequency.

The present invention can be equally applied to a color image display apparatus and, therefore, there is provided, in accordance with a second preferred embodiment of the present invention, an image display apparatus which comprises a color image display device including a plurality of dot-shaped picture elements arranged in a two-dimensional pattern, and a diffraction grating disposed on an optical path through which imagewise rays of light emerging from the color image display device travel. Even in this apparatus the diffraction grating has a spatial cut-off frequency which is chosen to lie between the Nyquist frequency, determined by an interval between color picture elements of identical color in a color filter employed in the color image display device, and a sampling frequency determined by an interval between the picture elements in the color image display device.

According to any one of the first and second preferred embodiments of the present invention, since the diffraction grating disposed on the optical path of the image display device is effective to provide a blur to the image being displayed, the possibility of the picture elements tend to be visually noticed in the form of a pattern of discontinuous dots can advantageously be minimized and, therefore, any possible reduction in quality of the image projected or viewed is suppressed. Also, due to a particular relationship among the spatial cut-off frequency, the Nyquist frequency and the sampling frequency, the spatial frequency characteristic of the diffraction grating can be advantageously improved, resulting in a suppression of any reduction in contrast of the image while providing a sensation of the high resolution.

According to a third preferred embodiment of the present invention, there is provided an image display apparatus which comprises an image display device including a plurality of dot-shaped picture elements arranged in a two-dimensional pattern, and a diffraction grating disposed on an optical path through which imagewise rays of light emerging from the image display device travel and having a grating pattern in one direction. In this image display apparatus according to the third preferred embodiment of the present invention, the intensity of ±1st order light relative to the intensity of 0-th order light in the diffraction grating is chosen to be within the range of 60 to 180% at a center wavelength of the image display device, and the sum of the intensity of the 0-th order light and the intensity of the ±1st order light relative to the intensity of total diffracted light is chosen to be equal to or higher than 80% at the center wavelength of the image display device.

It is to be noted that the center wavelength referred to in the present invention means a center value of the wavelength region of the imagewise rays of light emitted from the image display device (or an average value of wavelengths of red and blue rays of light in the case of the color image display device) and that the total diffracted light means all the diffracted light including the 0-th order light and light of ±1st or higher order light.

According to a fourth preferred embodiment of the present invention, there is provided an image display apparatus which comprises an image display device including a plurality of dot-shaped picture elements arranged in a two-dimensional pattern, and a diffraction grating disposed on an optical path through which imagewise rays of light emerging from the image display device travel and having grating patterns in two respective directions, In the image display apparatus according to the fourth preferred embodiment of the present invention, the intensity of ±1st order light relative to the intensity of 0-th order light in the diffraction grating is chosen to be within the range of 80 to 120% at a center wavelength of the image display device, and wherein the sum of the intensity of the 0-th order light and the intensity of the ±1st order light relative to the intensity of total diffracted light is chosen to be equal to or higher than 75% at the center wavelength of the image display device.

According to any one of the third and fourth preferred embodiments of the present invention, since the diffraction grating disposed on the optical path of the image display device is effective to provide a blur to the image being displayed, a possible reduction in quality of the image resulting from the presence of shades of non-linear elements and various bus electrodes is avoided. Moreover, due to the particular characteristic of the diffraction grating with respect to the intensity of both of the 0-th order light and the ±1st order light, a reduction in contrast of the image is advantageously suppressed thereby to provide a sensation of the high resolution.

Furthermore, according to a fifth preferred embodiment of the present invention, there is provided an image display apparatus which comprises an image display device including a plurality of dot-shaped picture elements arranged in a two-dimensional pattern, and a diffraction grating disposed on an optical path through which imagewise rays of light emerging from the image display device travel and having grating patterns in two respective directions. According to the fifth preferred embodiment of the present invention, the intensity of ±1st order light relative to the intensity of 0-th order light in the diffraction grating is chosen to be within the range of 60 to 180% at a center wavelength of the image display device, the intensity of (±1, ±1)-order light relative to the intensity of 0-th order light in the diffraction grating is chosen to be within the range of 20 to 330% at the center wavelength of the image display device, and the sum of the intensity of the 0-th order light, the intensity of the ±1st order light and the intensity of the (±1, ±1)-order light relative to the intensity of total difracted light is chosen to be equal to or higher than 70% at the center wavelength of the image display device.

According to the fifth preferred embodiment of the present invention, since the diffraction grating disposed on the optical path of the image display device is effective to provide a blur to the image being displayed, a possible reduction in quality of the image resulting from the presence of shades of nonlinear elements and various bus electrodes is avoided. Moreover, due to the particular characteristic of the diffraction grating with respect to the intensity of the 0-th order light, the ±1st order light and the (±1, ±1)-order light, a reduction in contrast of the image is advantageously suppressed thereby to provide a sensation of the high resolution.

Preferably, the diffraction grating has a plurality of grating elements each being in the form of a projection of a generally sinusoidal cross-sectional shape. With this type of diffraction grating, the intensity of high order diffracted light equal to or higher than ±2nd order diffracted light can be reduced thereby to further suppress any reduction in contrast of the image.

Also preferably, where the image display apparatus of the present invention is a viewfinder, the image display device has a plurality of picture elements arranged in horizontal and vertical directions. In this image display device, a grating pitch projected in any one of horizontal and vertical directions of the image display device is preferably chosen to be equal to or smaller than the pitch of the picture elements in the horizontal and vertical directions of the image display device. According to this feature, even though the viewer's eye is focused on the diffraction grating, no grating pattern is viewed substantially.

Again preferably, where the image display apparatus of the present invention is a viewfinder, the image display device has a color filter including color picture elements arranged in horizontal and vertical directions. In this image display device, a grating pitch projected in any one of horizontal and vertical directions of the color filter is preferably chosen to be equal to or smaller than a pitch of the color picture elements in the horizontal and vertical directions of the color filter. According to this feature, even though the viewer's eye is focused on the diffraction grating, no grating pattern is viewed substantially.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 15 is a diagram showing a Nyquist boundary in the color image display device shown in FIG. 12;

FIG. 16 is a three-dimensional graph showing an ideal spatial frequency characteristic of the diffraction grating;

FIG. 17 is a diagram showing another example of the arrangement of the picture elements in the color image display device;

FIG. 18 is a diagram showing a further example of the arrangement of the picture elements in the color image display device;

DETAILED DESCRIPTION OF THE EMBODIMENTS

Figure 1:
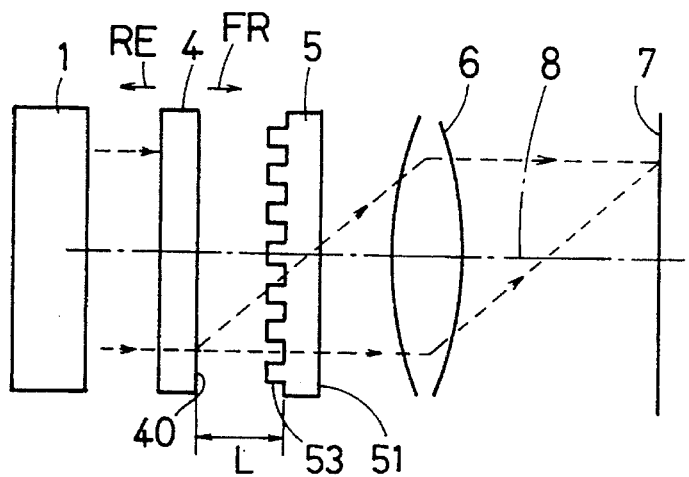
FIG. 1 is a schematic diagram showing an image display apparatus according to a first preferred embodiment of the present invention.

As an example of an image display apparatus according to the present invention, reference will now be made to a viewfinder including a liquid crystal display panel (a monochromatic image display device) as shown in FIG. 1. While the image display device will be described as employed in the form of a liquid crystal display panel, those skilled in the art will readily recognize that the present invention is equally applicable to the use of any other display device such as, for example, a plasma display panel (PDP), electroluminescence (EL) or light emitting diode (LED), provided that the image display device is of a type wherein picture elements are selectively energized.

Figure 29:
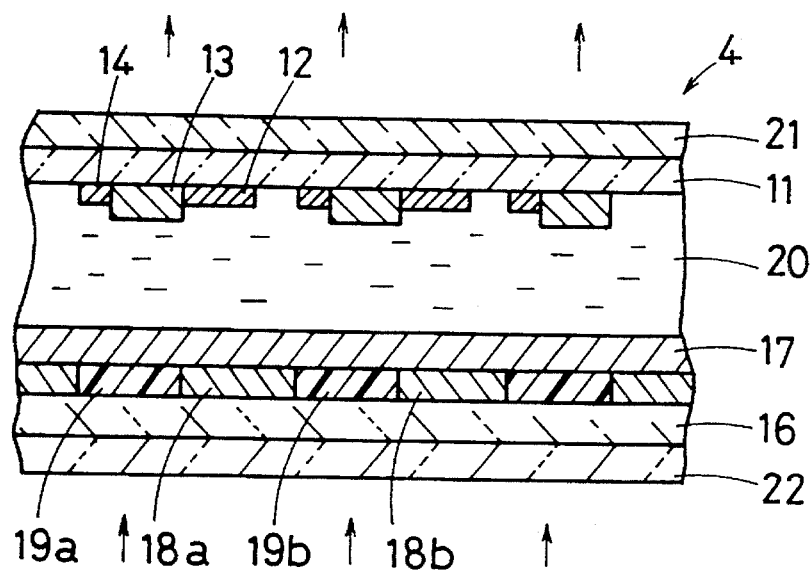
FIG. 29 is a schematic sectional view showing a portion of a prior art liquid crystal display panel.
Figure 30:
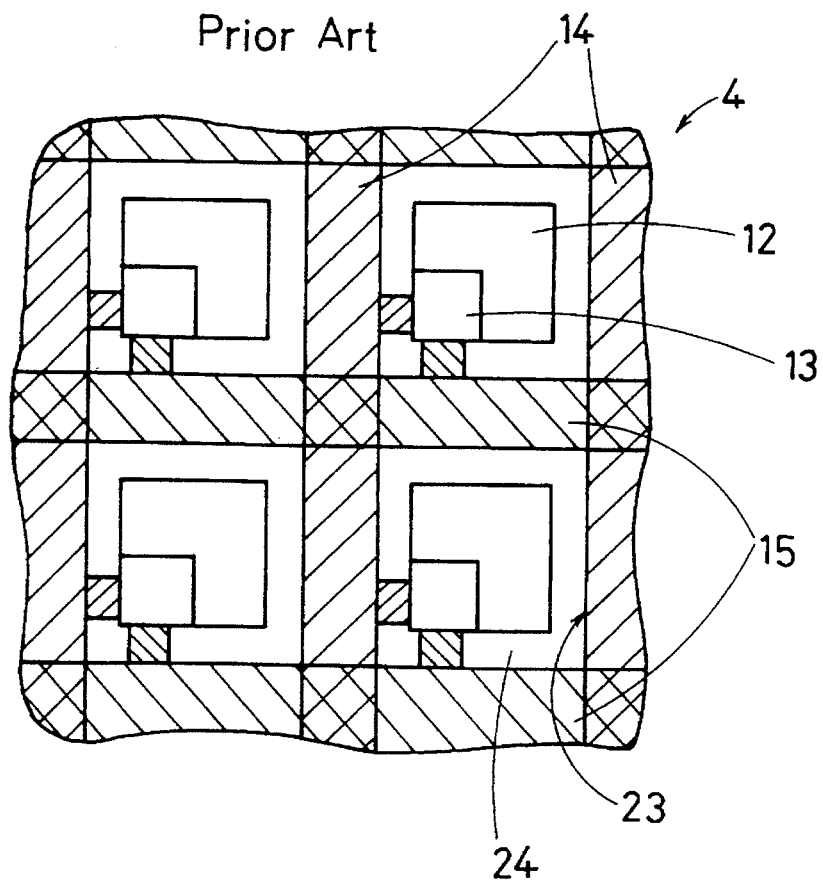
FIG. 30 is a schematic plan view showing a portion of the another prior art liquid crystal display panel.

Referring now to FIG. 1, the monochromatic viewfinder shown therein includes a back light source 1 positioned on a rear side RE of a liquid crystal display panel 4 with respect to the direction of travel of rays of light from the back light source 1 towards the liquid crystal display panel 4. A diffraction grating 5 is positioned on the front side FR of the liquid crystal display panel 4 remote from the back light source 1 and along an optical path through which imagewise rays of light originating from the liquid crystal display panel 4 travel. A viewer, represented by an eye 7, can view an image displayed on the liquid crystal display panel 4 through a viewfinder eyepiece lens 6. The liquid crystal display panel 4 is of a design capable of displaying images in response to receipt of a video signal such as originating from a television receiver set or a video tape player and is of any known construction such as shown in FIGS. 29 and 30.

The back light source 1 referred to above may comprise any suitable lamp such as, for example, halogen lamp, xenon lamp, metal halide lamp or fluorescent tube, in combination with any suitable diffuser plate or a combination of any one of these lamps, a light guide plate and a diffuser plate.

Figure 2:
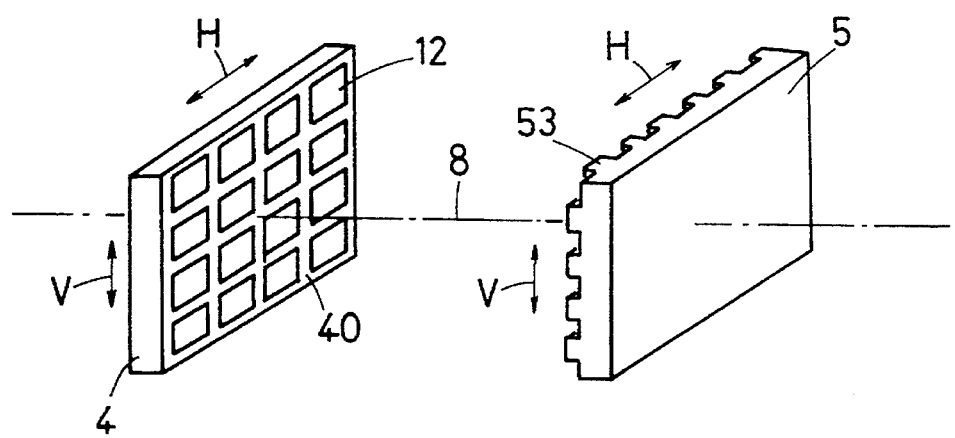
FIG. 2 is a perspective view showing an arrangement of an liquid crystal display panel and a diffraction grating both employed in the image display apparatus shown in FIG. 1.

As best shown in FIG. 2, the liquid crystal display panel 4 has a display surface 40 lying perpendicular to an optical axis 8 and also has a matrix array of dot-like picture elements 12 including a plurality of dot-like picture elements 12 arranged in a matrix pattern. Hence, the matrix array of the picture element 12 includes column picture elements arranged in a vertical direction V and line picture elements arranged in a horizontal direction H. Similarly, the diffraction grating 5 has a plurality of grating elements 53 arranged in a matrix pattern similar to the matrix array of the picture elements 12, and hence, includes column grating elements extending in the vertical direction V and line grating elements extending in the horizontal direction H. The liquid crystal display panel 4 and the diffraction grating 5 are disposed parallel to each other and transversely in alignment with an optical axis 8 of the system.

Figure 3:
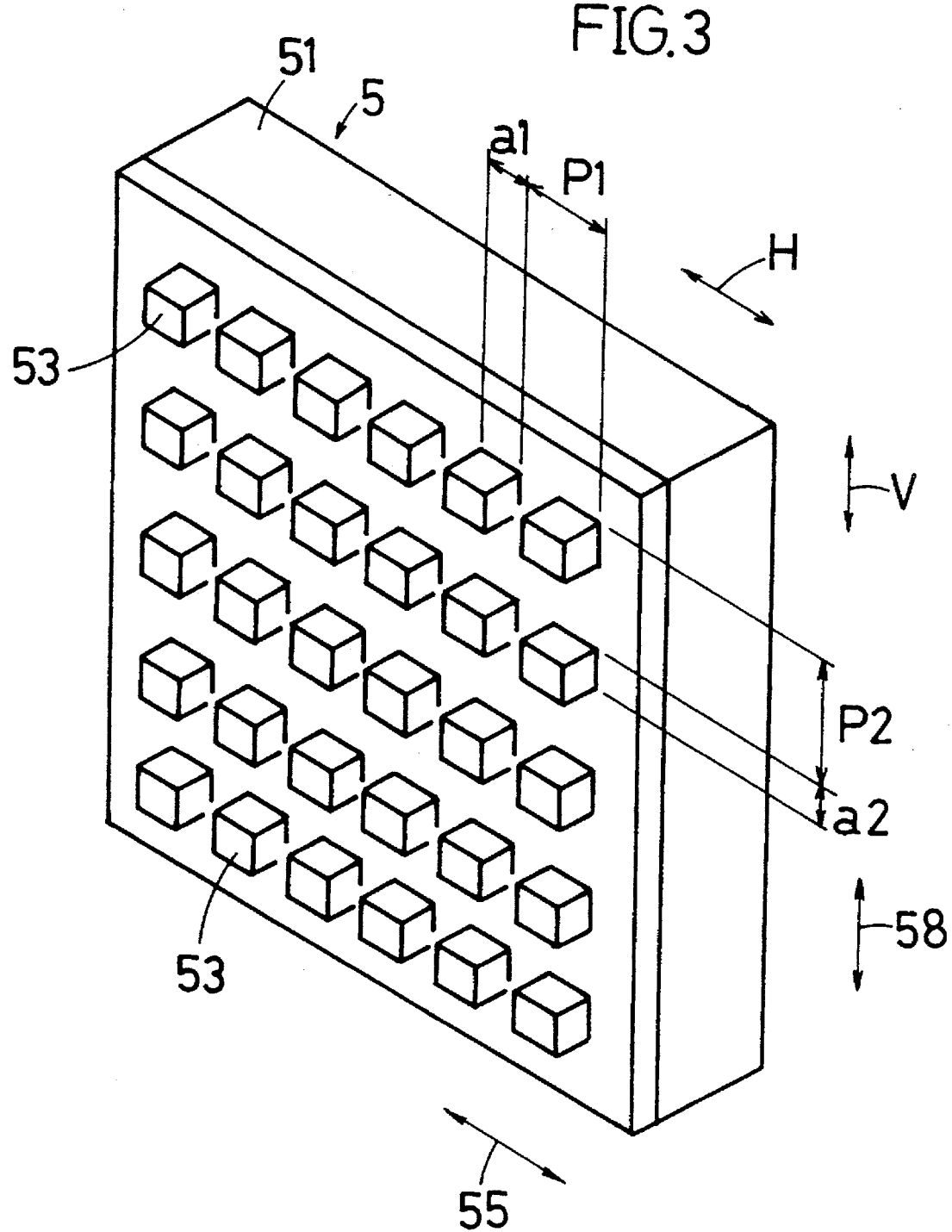
FIG. 3 is a perspective view, on an enlarged scale, showing the diffraction grating shown in FIG. 1.

The details of the diffraction grating 5 are best shown in FIG. 3. As shown therein the diffraction grating 5 comprises a transparent substrate 51 having first and second major surfaces opposite to each other, and a plurality of generally rectangular-sectioned grating projections (examples of the grating elements) 53 formed on the first major surface of the transparent substrate 51 in a matrix pattern. As described above, this diffraction grating 5 is disposed parallel to the liquid crystal display panel 4 with the grating projections 53 patterned in a plane perpendicular to the optical axis 8.

Let it be assumed that, in the line grating projections 53 forming a grating, the width of each grating projection 53 as measured in the horizontal direction H is expressed by a1; the length of each grating projection 53 as measured in a direction parallel to the optical axis 8, that is, the optical height of the grating, is expressed by $\delta$; and the pitch between each neighboring grating projection 53 as measured in the horizontal direction H is expressed by P1. If the diffraction grating 5 having the grating projections of the generally rectangular cross-section satisfies the following equations as disclosed in the Japanese Patent Publication No. 49-20105 published in May 22, 1974, the response is sufficiently lowered at a spatial cut-off frequency (a frequency characteristic in which rays of light of a frequency exceeding this spatial cut-off frequency are cut off) and, hence, the diffraction grating 5 satisfactorily acts as an optical low-pass filter. Accordingly, the diffraction grating 5 serves to reduce shades of picture element electrodes 12 of the liquid crystal display panel 4 to a value within a tolerance.

$$\cos\delta \geq -1 \quad (1)$$

$$P1/a1 \geq 2 \quad (2)$$

$$\cos\delta \leq 1 - 0.35 P1/a1 \quad (3)$$

$$\cos\delta \leq 1 - 0.65 P1/a1 \quad (4)$$

The spatial cut-off frequency fc of the diffraction grating 5 is expressed by the following equation, wherein the distance between the liquid crystal display panel 4, shown in FIG. 1, and the first surface of the transparent substrate 51 of the diffraction grating 5 is expressed by L and the wavelength of the illuminating light originating from the back light source 1 is expressed by $\lambda$:

$$fc = a/L\lambda \quad (5)$$

The foregoing equations (1) to (5) and the associated description equally apply to the column grating projections 53 having a width a2 as measured in the vertical direction V, the optical height 6, and a pitch P2 between each neighboring column grating element 53.

Hereinafter, the relationship of the spatial cut-off frequency and the sampling frequency with the Nyquist frequency, which forms a heart of the present invention, will now be discussed.

Figure 4:
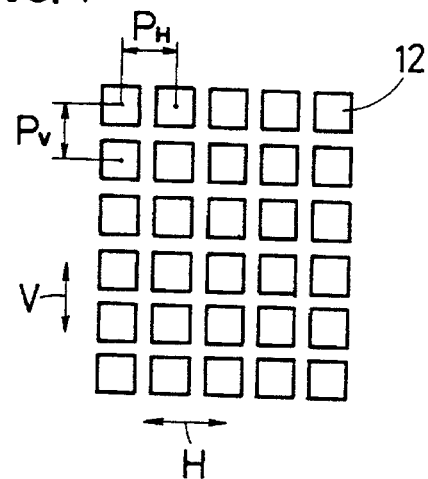
FIG. 4 is a plan view showing an arrangement of picture elements in a monochromatic image display device.
Figure 5:
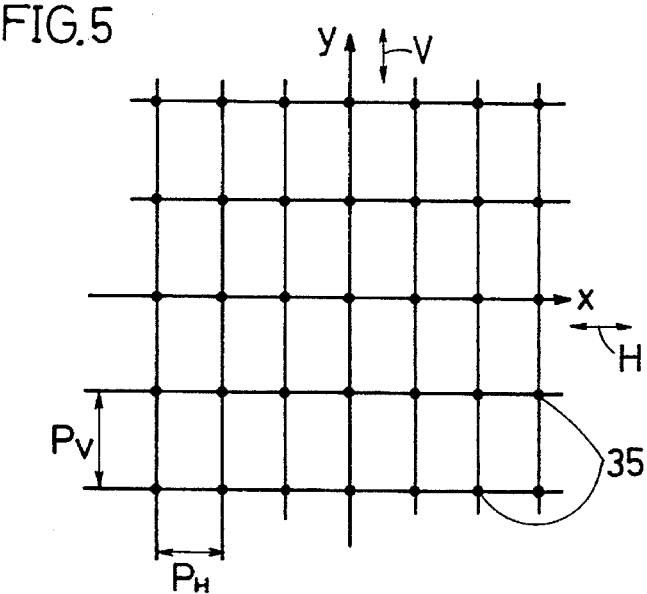
FIG. 5 is a diagram showing a sampling grating employed in the monochromatic image display device employing the picture elements arranged as shown in FIG. 4.
Figure 6:
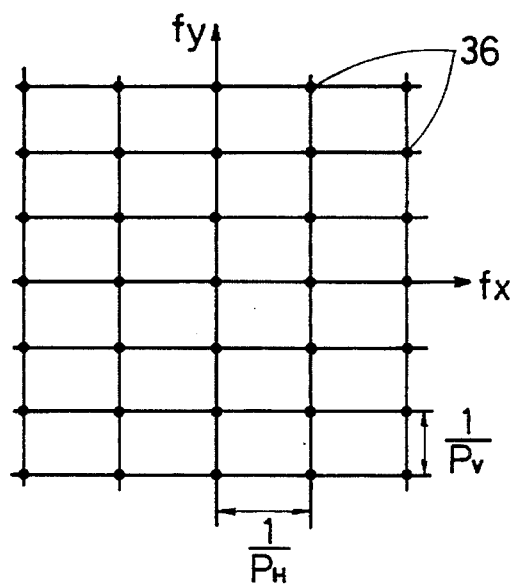
FIG. 6 is a diagram showing a sampling frequency grating obtained from the sampling grating shown in FIG. 5.
Figure 7:
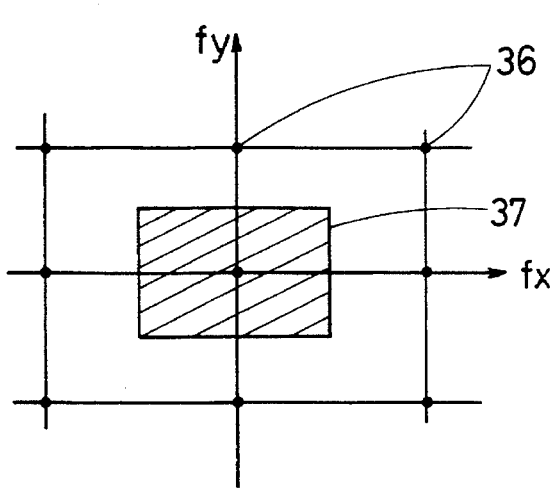
FIG. 7 is a diagram showing a Nyquist boundary in the monochromatic image display device shown in FIG. 4

One example of an arrangement of the picture elements 12 of the liquid crystal display panel 4 is shown in FIG. 4. It is to be noted that, in FIG. 4, the picture elements 12 are arranged so as to have lines of picture elements 12 extending in the horizontal direction H and columns of picture elements 12 extending in the vertical direction V, which are perpendicular to each other as hereinbefore described, and such that each neighboring column picture elements 12 has a pitch $P_V$ while each neighboring line picture elements 12 has a pitch $P_H$. Accordingly, sampling gratings 35 of the liquid crystal display panel 4 are in the form of a grid as shown in FIG. 5. As shown in FIG. 5, respective sampling intervals (corresponding to the distance between each neighboring picture elements) in x- and y-directions (conforming to the horizontal and vertical directions H and V, respectively) are expressed by $P_H$ and $P_V$. Fourier transformation of the sampling gratings 35 results in such sampling frequency gratings 36 at frequency spaces as shown in FIG. 6. fx and fy shown in FIG. 6 represent respective axes of spatial frequencies in the x- and y-directions. In this case, the sampling frequency, that is, the spatial frequency corresponding to the pitch of each neighboring picture elements, is $1/P_H$ in the x-direction and $1/P_V$ in the y-direction. The Nyquist boundary representing the maximum spatial frequency capable of being displayed lies at a point intermediate between the sampling frequency gratings 36, and the Nyquist boundary 37 in the liquid crystal display panel 4 shown in FIG. 4 is such as shown in FIG. 7. In other words, the Nyquist frequencies in the x- and y-directions are expressed by $\frac{1}{2}P_H$ and $\frac{1}{2}P_V$.

Figure 8A:
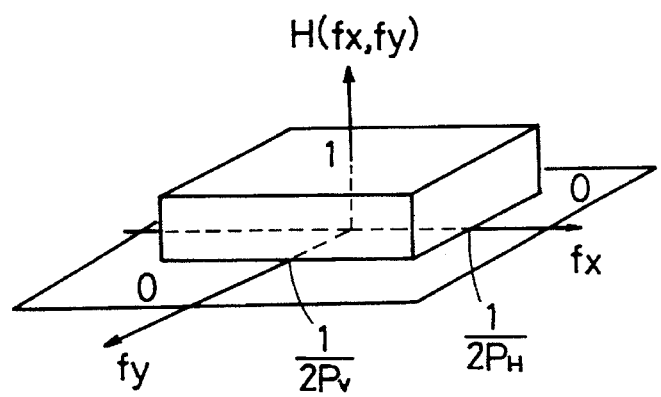
FIG. 8A is a three-dimensional graph showing an ideal spatial frequency characteristic of the diffraction grating.
Figure 8B:
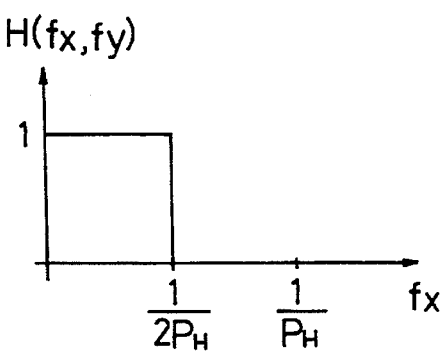
FIG. 8B is a two-dimensional graph showing an ideal spatial frequency characteristic of the diffraction grating.
Figure 9:
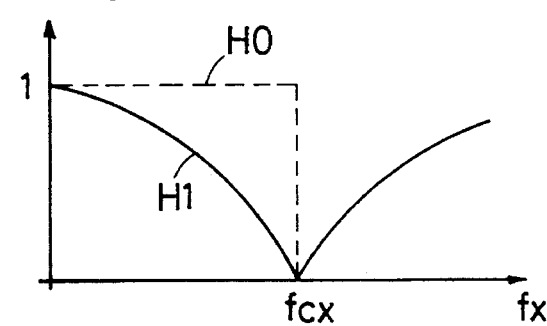
FIG. 9 is a graph showing an example of an actual spatial frequency characteristic of the diffraction grating.

If the spatial frequency characteristic MTF (Modulation Transfer Function) of the diffraction grating 5 is expressed by H(fx, fy), it is considered ideal that H(fx, fy) assumes 1 within the Nyquist boundary (hatched area shown in FIG. 7) and 0 (zero) outside the Nyquist boundary (See FIGS. 8A and 8B). However, the spatial frequency characteristic H1 of the diffraction grating 5 is such as shown in FIG. 9 and does not represent a rectangular shape. Accordingly, when the spatial cut-off frequencies in the x- and y-directions (determined by the equation (5) above for the projections of rectangular cross-section) are expressed by fcx and fcy, respectively, and if the spatial cut-off frequency fcx or fcy is made to match with the Nyquist frequency $\frac{1}{2}P_H$ or $\frac{1}{2}P_V$, regions of the above described sampling frequencies $1/P_H$ and $1/P_V$ which are higher than the Nyquist frequency are cut off and, therefore, the picture elements will not be observed discontinuous, but, as compared with the ideal spatial frequency characteristic H0 as shown by broken lines in FIG. 9, the characteristic is lowered at a low frequency region accompanied by a lowering of the contrast thereby to fail to provide a sensation of a high resolution.

Figure 10:
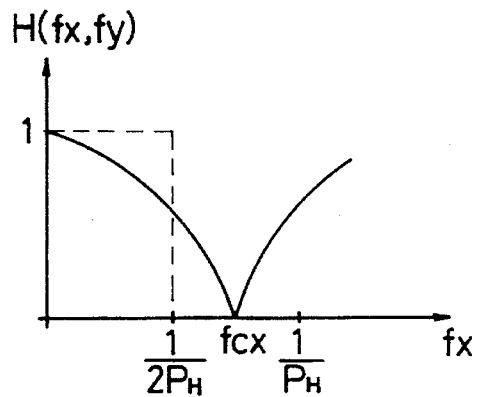
FIG. 10 is a graph showing a spatial frequency characteristic of the diffraction grating employed in the practice of the present invention.

However, when in accordance with the present invention the spatial cut-off frequencies fcx or fcy is chosen to lie between the above described Nyquist frequency $\frac{1}{2}P_H$ or $\frac{1}{2}P_V$ and the sampling frequency $1/P_H$ or $1/P_V$, the above described spatial frequency characteristic H1 shown by the solid line in FIG. 10 approaches the ideal spatial frequency characteristic H0 and, therefore, not only is the problem in that the picture elements are observed discontinuous solved, but the lowering of the contrast is suppressed, thereby providing a sensation of a high resolution.

Figure 11:
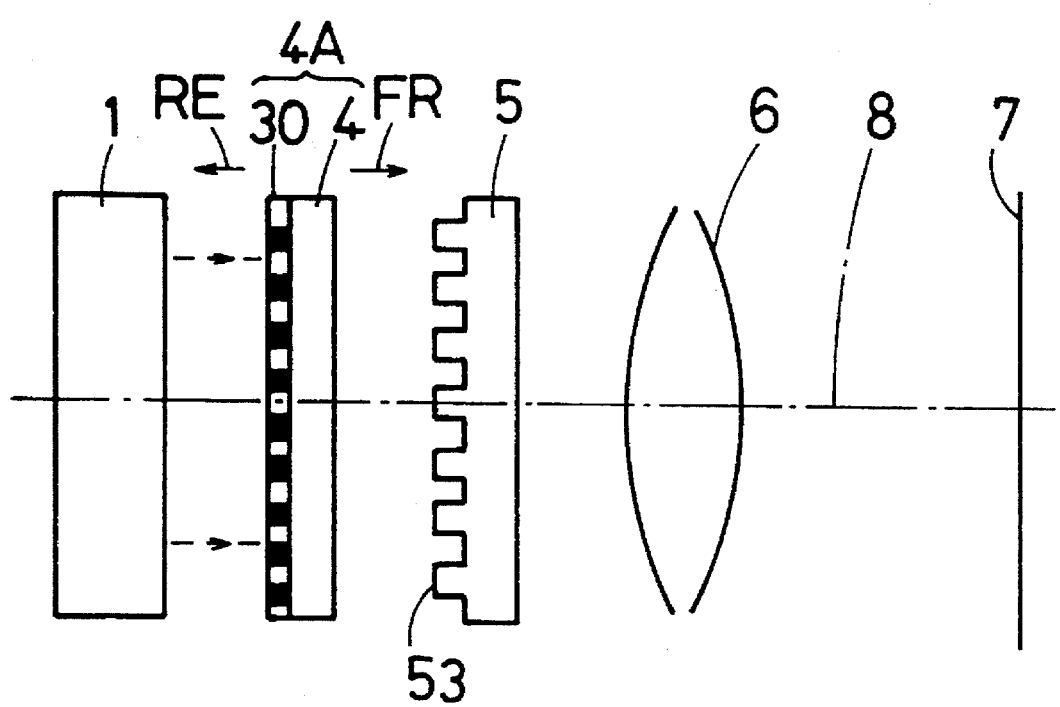
FIG. 11 is a schematic diagram showing a color image display apparatus according to another preferred embodiment of the present invention.

On the other hand, in a color image display device 4A shown in FIG. 11, a color filter 30 is employed which includes a matrix array of color picture elements corresponding to the picture elements of the liquid crystal display panel 4 as shown in FIG. 11.

Figure 12:
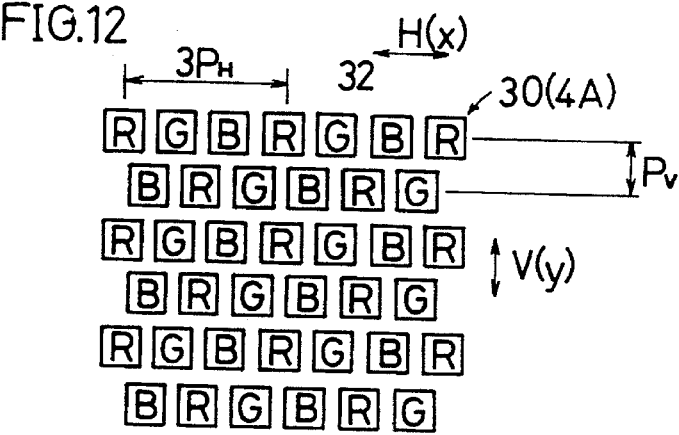
FIG. 12 is a schematic diagram showing one example of an arrangement of picture elements employed in the color image display device shown in FIG. 11.
Figure 13:
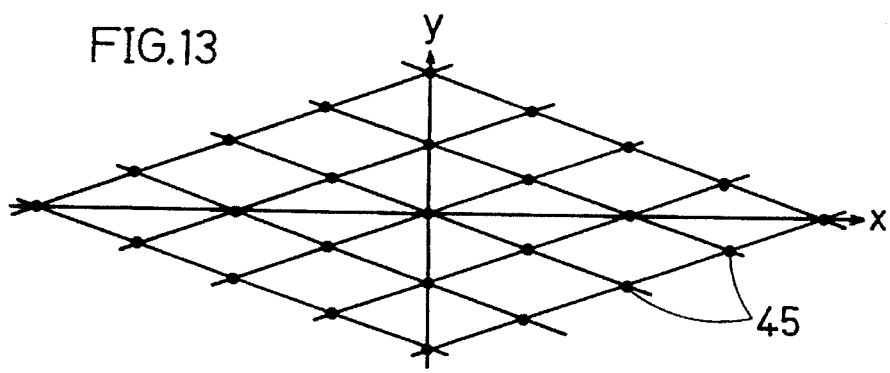
FIG. 13 is a diagram showing a sampling grating for color picture elements of equal color in the arrangement of the picture element shown in FIG. 12.
Figure 14:
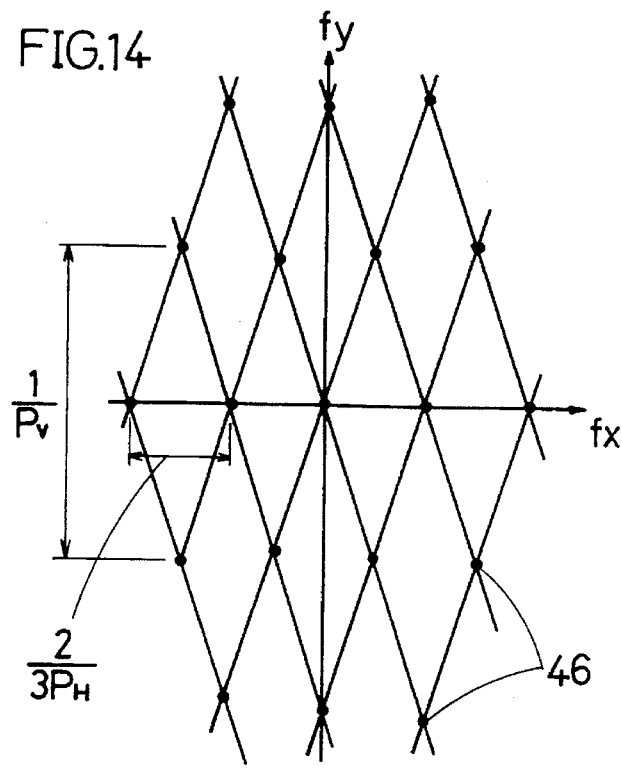
FIG. 14 is a diagram showing a sampling frequency grating obtained from the sampling grating shown in FIG. 13.

A specific example of the color image display device 4A is best shown in FIG. 12. A sampling frequency grating 45 of color picture elements 32 in one color (for example, red) employed in a matrix pattern of the color elements shown in FIG. 12 is shown in FIG. 13. When this sampling grating 45 is subjected to Fourier transformation, a sampling frequency grating 46 is determined as shown in FIG. 14. The Nyquist boundary lies at a point intermediate between each neighboring gratings of the sampling frequency grating 46 and, therefore, the Nyquist frequency is expressed by $\frac{1}{3}P_H$ and ½$P_V$. The Nyquist boundary 47 is positioned exteriorly of a hatched area shown in FIG. 15. The ideal spatial frequency characteristic of the diffraction grating 5 with the above described Nyquist boundary 47 is 1 within the Nyquist boundary and 0 (zero) outside the Nyquist boundary as shown in FIG. 16.

When in accordance with the present invention the spatial cut-off frequency fcx or fcy of the diffraction grating 5 is chosen to lie between the Nyquist frequency ½$P_H$ or ½$P_V$ and the above described sampling frequency 1/$P_H$ or 1/$P_V$ determined by the interval between each neighboring picture elements 12, the spatial frequency characteristic H1 of the diffraction grating 5 approaches the ideal spatial frequency characteristic H0 as hereinbefore described. As a result thereof, not only is the problem in that the picture elements are observed discontinuous solved, but the lowering of the contrast is suppressed, thereby providing a sensation of a high resolution.

It is to be noted that the spatial cut-off frequency employed in the image display apparatus of the present invention provided with the color image display device 4A is preferably chosen to lie within the above described range and, at the same time, between the Nyquist frequency ½$P_H$ or ½$P_V$, determined by the interval between each neighboring picture elements 12 in the image display device 4A, and the sampling frequency 1/$P_H$ or 1/$P_V$.

In view of the foregoing, in the embodiment of the present invention shown in FIGS. 1 to 3, the spatial cut-off frequency of the diffraction grating 5 is chosen to lie between the Nyquist frequency, determined by the interval between the picture elements 12 of the liquid crystal display panel 4, and the sampling frequency. On the other hand, where the color liquid crystal display panel 4A shown in FIG. 11 is employed, the spatial cut-off frequency of the diffraction grating 5 is chosen to lie between the Nyquist frequency, determined by the interval between the color picture elements 32 in the same color in the color filter 30, the sampling frequency determined by the interval between the neighboring picture elements 12.

The color filter 30 which may be employed in the color image display device 4A may be of a design wherein each set of the color picture elements represents a generally triangular shape and is composed of R (red), G (green) and B (blue) picture elements as shown in FIG. 12, of a design wherein sets of the R, G and B color elements 32 are so disposed as to alternate with each other for each horizontal line as shown in FIG. 17, or of a design wherein each set of the R, G and B picture elements is so disposed to represent a generally rectangular shape as shown in FIG. 18.

Figure 19:
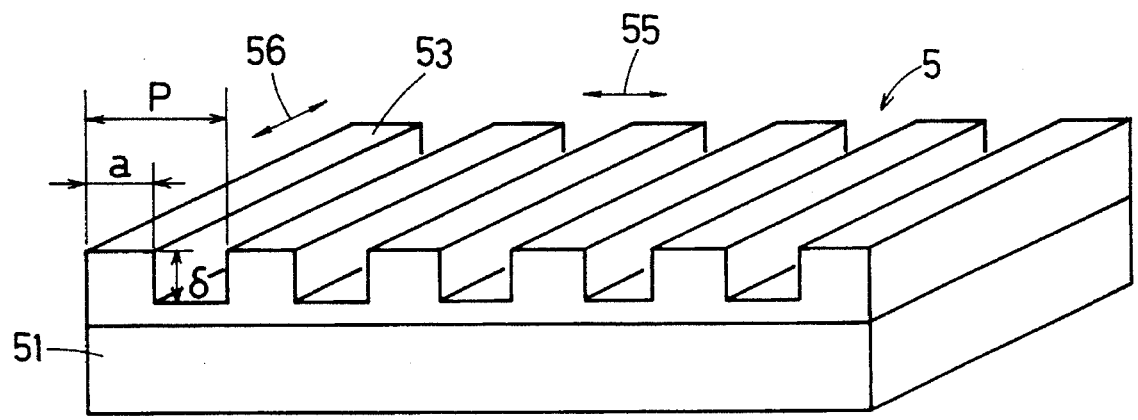
FIG. 19 is a perspective view, on an enlarged scale, showing an example of the diffraction grating having a grating pattern formed in one direction.

In the foregoing embodiment, reference has been made to the use of the diffraction grating 5 of a two-dimensional grating pattern wherein the grating projections 53 are arranged in a grid pattern in two directions. However, the present invention can employ the diffraction grating of a single-dimensional design wherein the grating pattern extends only in one direction such as shown in FIG. 19.

Also, although each of the grating elements forming the diffraction grating 5 has been described as having a generally rectangular cross-sectioned projection 53, it may not be always limited thereto and, in place of the grating projections 53 each being of the generally rectangular cross-sectional shape, morphologically modulated grating elements of any other shape such as trapezoidal cross-section or sinusoidal cross-section or grating elements having a modulated index of refraction may also be employed for the diffraction grating 5. Since the diffraction grating of the type wherein the grating elements are arranged in one dimension or two dimensions can function in a manner similar to an optical low-pass filter, it can be used for the diffraction grating 5 employed in the practice of the present invention.

Figure 20:
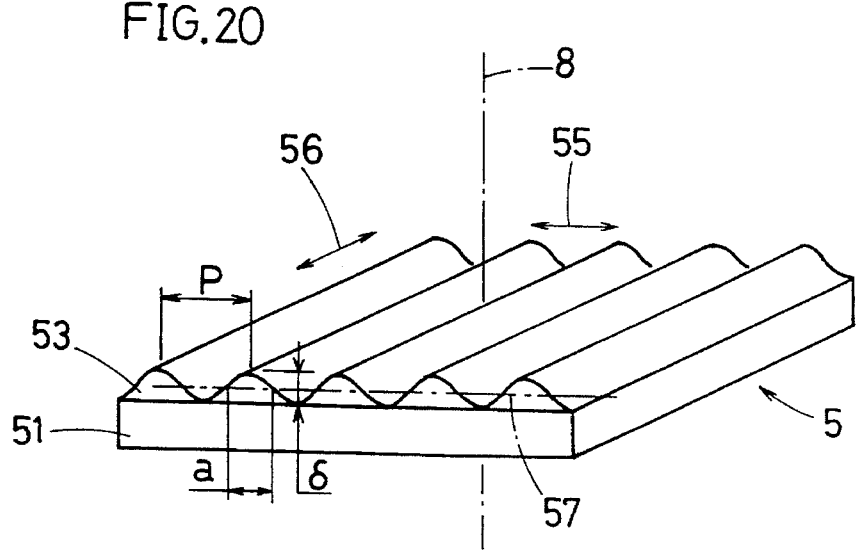
FIG. 20 is a perspective view, on an enlarged scale, showing another example of the diffraction grating having a grating pattern formed in one direction.

An example of the diffraction grating 5 of a one dimensional pattern wherein the grating elements are in the form of grating projections 53 each having a generally sinusoidal cross-section and arranged in one direction 55 is shown in FIG. 20 wherein the width a of each grating projection 53 is defined as measured at a mid-center line 57 of the shape of a sinusoidal wave.

The direction 55 in which the grating pattern develops in the diffraction grating 5 of a type having the grating pattern in one direction may lie in either a horizontal direction H or a vertical direction V relative to the picture elements 12 of the liquid crystal display panel 4 in FIG. 2, or may lie diagonally relative to the horizontal direction H or the vertical direction V of the picture elements 12.

The inventors of the present invention have conducted a series of experiments to determine other characteristics of the diffraction grating 5 than the spatial cut-off frequency characteristic thereof and the lowering of the image quality and the contrast. Specifically, using the various diffraction gratings of the type wherein the grating pattern develops in one direction, but having different characteristics as shown in Table 1, the extent to which the lowering of the image quality attributable to shades resulting from switching electrodes and bus electrodes is eliminated and the level of contrast of the image displayed were examined. The diffraction intensity ratio A shown in Table 1 was varied with a change in optical height of the grating, and the light transmittance B was varied with a change in cross-sectional shape of the grating.

TABLE 1

| No. of Grating | Diffracted Light Intensity | | Evaluation of Image | |
|---|---|---|---|---|
| | Ratio A (%) | Ratio B (%) | Image Quality | Contrast |
| 1 | 40 | 90 | x | o |
| 2 | 55 | 90 | x | o |
| 3 | 60 | 75 | o | x |
| 4 | 60 | 80 | o | o |
| 5 | 60 | 89 | o | o |
| 6 | 80 | 75 | o | x |
| 7 | 80 | 80 | o | o |
| 8 | 80 | 88 | o | o |
| 9 | 100 | 75 | o | x |
| 10 | 100 | 80 | o | o |
| 11 | 100 | 88 | o | o |
| 12 | 120 | 75 | o | x |
| 13 | 120 | 80 | o | o |
| 14 | 120 | 88 | o | o |
| 15 | 140 | 86 | o | o |
| 16 | 160 | 86 | o | o |
| 17 | 180 | 75 | o | x |
| 18 | 180 | 80 | o | o |
| 19 | 180 | 88 | o | o |
| 20 | 190 | 86 | o | x |
| 21 | 200 | 86 | o | x |

In the above Table 1, o represents Good and x represents Unacceptable. Also, Ratio A represents the ratio of the intensity of the ±1st order light relative to the intensity of the 0-th order light at 550 nm (the center wavelength of the above described liquid crystal display device) and Ratio B (light transmittance) represents the ratio of the sum of the intensity of the 0-th order light and that of the ±1st order light relative to the intensity of all of the diffracted light at 550 nm.

As a result of the experiments shown in Table 1, it has been found that, where, for example, in the diffraction grating having the grating pattern developing in one direction as shown in FIG. 19, the ratio of the intensity of the ±1st order light relative to the intensity of the 0-th order light is within the range of 60 to 180% at 550 nm (the center wavelength of the above described liquid crystal display device) and the light transmittance B of the sum of the intensity of the 0-th order light and that of the ±1st order light relative to the intensity of all of the diffracted light is not lower than 80%, the reduction in image quality resulting from the shape of non-linear elements and the electrodes can be avoided and the extent to which the contrast of the image being viewed is lowered can be reduced.

Figure 21:
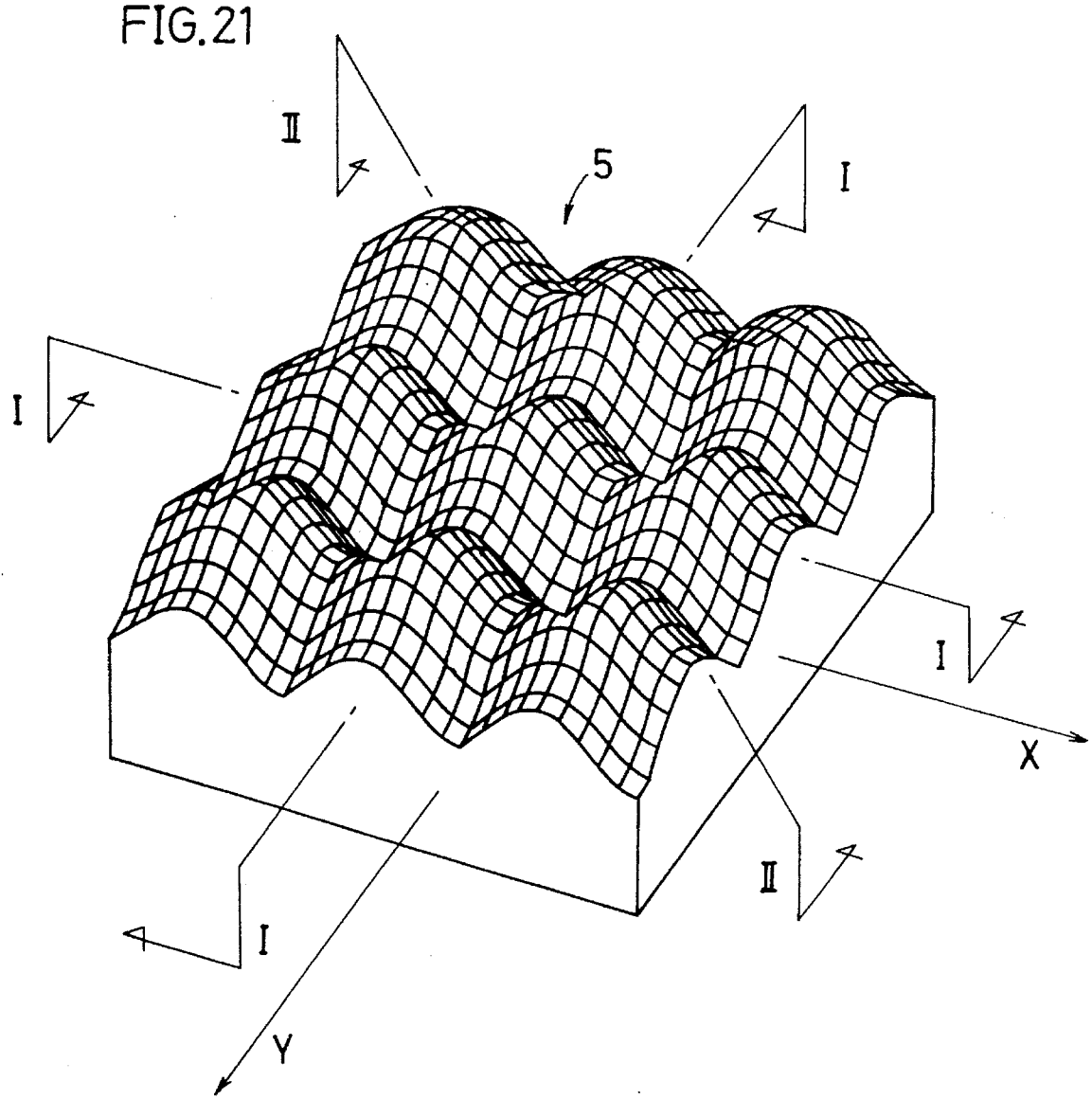
FIG. 21 is a perspective view showing another example of the diffraction grating in which grating elements are formed in two directions.
Figure 22:
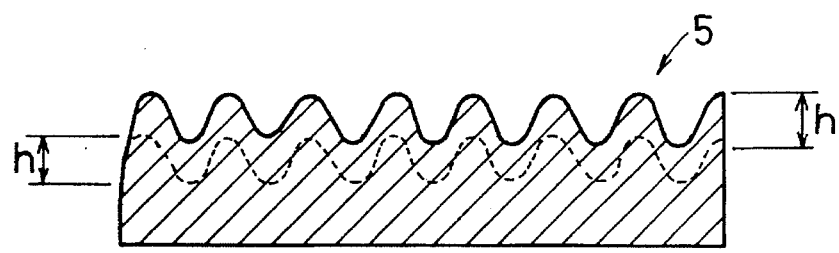
FIG. 22 is a cross-sectional view of the diffraction grating taken along the line I—I in FIG. 21.

Using the various diffraction gratings of the type wherein the grating pattern develops in two directions perpendicular to each other, having different characteristics, the inventors of the present invention have also conducted a series of experiments to determine the extent to which the lowering of the image quality attributable to shades resulting from switching electrodes and bus electrodes is eliminated and the level of contrast of the image displayed. An example of the diffraction grating having the grating pattern of a cross-sectional shape similar to a sine wave developing in the two directions is shown in FIG. 21. The diffraction grating shown in FIG. 21 has the grating patterns in two directions (x- and y-directions) perpendicular to each other. The cross-section taken along the line I—I corresponding to any one of the x-direction and the y-direction of the diffraction grating shown in FIG. 21 is shown in FIG. 22. As shown in FIG. 22, the height h (the difference in height between each projection and the corresponding recess) of the grating patterns is substantially constant.

Figure 23:
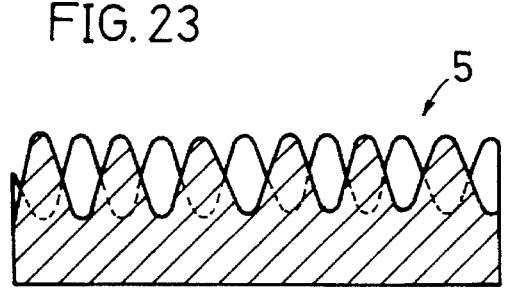
FIG. 23 is a cross-sectional view of the diffraction grating taken along the line II—II in FIG. 21.
Figure 24:
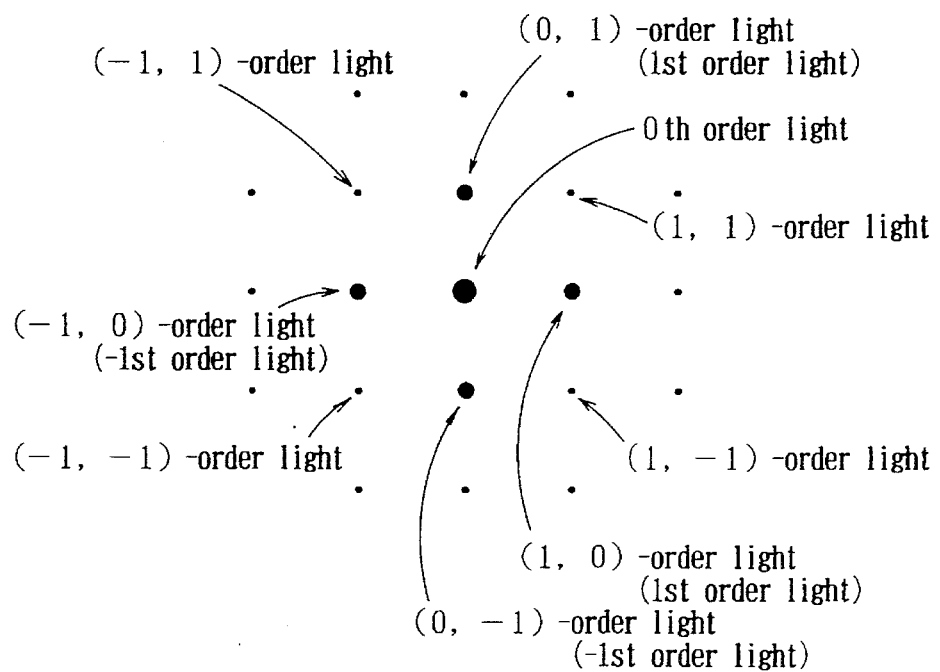
FIG. 24 is a diagram showing a diffraction pattern exhibited by the diffraction grating shown in FIG. 21.

It is, however, to be noted that the height of the grating pattern in the x-direction and that in the y-direction may differ from each other. It is also to be noted that, although it seems that there exists a grating pattern of a constant height in a direction differing from the direction (x- or y-direction) of the grating pattern in the diffraction grating, the cross-sectional representation taken along the line II—II as shown in FIG. 23 makes it clear that there exists no grating pattern of the constant height in the direction other than any one the x- and y-directions of the diffraction grating. When the parallel rays of light are projected onto the diffraction grating having the grating patterns in the two directions as shown in FIG. 21, the pattern of diffracted rays of light as shown in FIG. 24 can be obtained.

As a result of the experiments conducted using the diffraction gratings having the grating patterns in the two directions and having different characteristics as shown in Tables 2 and 3, it has been found that, (1) where the ratio A of the intensity of the ±1st order light relative to the intensity of the 0-th order light at 550 nm (the center wavelength of the above described liquid crystal display device) is within the range of 80 to 120% and the ratio (light transmittance) B of the sum of the intensity of the 0-th order light and that of the ±1st order light relative to the intensity of all of the diffracted light is not lower than 75% (See Table 2) or (2) where the ratio A of the intensity of the ±1st order light relative to the intensity of the 0-th order light at 550 nm is within the range of 60 to 180% and the ratio A1 of the intensity of the (±1, ±1)-order light relative to the intensity of the 0-th order light is within the range of 20 to 330% and, at the same time, the ratio (light transmittance) B1 of the sum of the intensity of the 0-th order light, that of the ±1st order light and that of the (±1, ±1)-order light relative to the intensity of all of the diffracted light is not lower than 70%, the reduction in image quality resulting from the shape of non-linear elements and the electrodes can be avoided and the extent to which the contrast of the image being viewed is lowered can be reduced. This is because, in any one of the above described cases (1) and (2), the intensity of light encompassed within a region delimited by the (1, 1)-order light, (1, −1)-order light, (−1, −1)-order light and (−1, 1)-order light is high and a ratio in brightness between a center area and an outer peripheral area within the region falls within a favorable range.

TABLE 2

| No. of Grating | Diffracted Light Intensity | | Evaluation of Image | |
|---|---|---|---|---|
| | Ratio A (%) | Ratio B (%) | Image Quality | Contrast |
| 22 | 60 | 85 | x | o |
| 23 | 80 | 83 | o | o |
| 24 | 100 | 80 | o | o |
| 25 | 120 | 75 | o | o |
| 26 | 140 | 74 | o | x |
| 27 | 80 | 74 | o | x |
| 28 | 100 | 72 | o | x |
| 29 | 120 | 69 | o | x |

In Table 2 above, o represents Good and × represents Unacceptable. Also, Ratio A represents the ratio of the intensity of the ±1st order light relative to the intensity of the 0-th order light at 550 nm (the center wavelength of the above described liquid crystal display device) and Ratio B represents the ratio of the sum of the intensity of the 0-th order light and that of the ±1st order light relative to the intensity of all of the diffracted light at 550 nm.

Similarly in the following Table 3:

A: Ratio of the intensity of the ±1st order light relative to the intensity of the 0-th order light at 550 nm;

A1: Ratio of the intensity of the (±1, ±1)-order light relative to the intensity of the 0-th order light; and B1: Ratio of the sum of the intensity of the 0-th order light, that of the ±1st order light and that of the (±1, ±1)-order light relative to the intensity of all of the diffracted light.

TABLE 3

| No. of Grating | Diffracted Light Intensity (%) | | | Evaluation of Image | |
|---|---|---|---|---|---|
| | Ratio A | Ratio A1 | Ratio B1 | Image Quality | Contrast |
| 30 | 50 | 10 | 55 | x | x |
| 31 | 50 | 20 | 65 | x | x |
| 32 | 50 | 30 | 70 | x | o |
| 33 | 50 | 50 | 85 | x | o |
| 34 | 60 | 10 | 60 | x | x |
| 35 | 60 | 20 | 65 | o | x |
| 36 | 60 | 40 | 85 | o | o |
| 37 | 60 | 50 | 90 | o | o |
| 38 | 100 | 10 | 60 | x | x |
| 39 | 100 | 20 | 70 | o | o |
| 40 | 100 | 45 | 90 | o | o |
| 41 | 100 | 95 | 95 | o | o |
| 42 | 130 | 30 | 60 | o | x |
| 43 | 130 | 50 | 70 | o | o |
| 44 | 130 | 70 | 80 | o | o |
| 45 | 130 | 90 | 90 | o | o |
| 46 | 150 | 60 | 60 | o | x |
| 47 | 150 | 100 | 70 | o | o |
| 48 | 150 | 330 | 95 | o | o |
| 49 | 150 | 340 | 95 | o | x |
| 50 | 180 | 100 | 80 | o | o |
| 51 | 180 | 190 | 85 | o | o |

TABLE 3-continued

| No. of Grating | Diffracted Light Intensity (%) | | | Evaluation of Image | |
|---|---|---|---|---|---|
| | Ratio A | Ratio A1 | Ratio B1 | Image Quality | Contrast |
| 52 | 180 | 330 | 95 | o | o |
| 53 | 180 | 340 | 95 | o | x |
| 54 | 190 | 100 | 75 | o | x |
| 55 | 190 | 190 | 85 | o | x |
| 56 | 190 | 330 | 95 | o | x |
| 57 | 190 | 340 | 95 | o | x |

It is to be noted that the angle formed between the grating patterns developed in the respective two directions in the two-dimensional diffraction grating is not always limited to 90 degrees and that the present invention suffices if the grating patterns developed in the respective directions different are formed on the first and second major surfaces of the substrate so as to be offset from each other.

Also, the inventors of the present invention made some diffraction gratings having morphologically modulated grating elements of different sectional shape for testing purpose and measured the intensity of the diffracted light exhibited by each of those diffraction gratings. As a result of the measurement, it has been found that, as compared with the diffraction grating having the grating elements comprised of generally rectangular or trapezoidal sectioned projections, the diffraction grating-shaving the grating elements comprised of generally sinusoidally sectioned projections have exhibited the lowest intensity of higher order diffracted light than ±2nd order and that, when the diffraction grating having the generally sinusoidally sectioned grating projections was used in a viewfinder of a type employing a projection-type liquid crystal display device, the rate of reduction in contrast of the projected image could be suppressed.

At this time, when the diffraction grating 5 having the rectangular sectioned projections 53 as shown in FIG. 19 was disposed perpendicular to the optical axis 8 and when the ratio between the intensity of 0-th order diffracted light and the intensity of the ±1st order diffracted light was assumed to be 1, the ratio of the intensity of each of the ±1 to ±10-th order diffracted light relative to the intensity of the 0-th order diffracted light was measured, a result of which is tabulated in Table 4. The diffraction grating 5 used for this measurement had the width a of 7 μm, the pitch P of 21 μm and the optical height δ of 0.74π.

TABLE 4

| Rectangular-sectioned Diffraction Grating | |
|---|---|
| | Relative to 0-th order Diffracted Light |
| ±1st order Diffracted Light | 100.0% |
| ±2nd order Diffracted Light | 25.0% |
| ±3rd order Diffracted Light | 0.0% |
| ±4-th order Diffracted Light | 6.3% |
| ±5-th order Diffracted Light | 4.0% |
| ±6-th order Diffracted Light | 0.0% |
| ±7-th order Diffracted Light | 2.0% |
| ±8-th order Diffracted Light | 1.6% |
| ±9-th order Diffracted Light | 0.0% |
| ±10-th order Diffracted Light | 1.0% |

TABLE 5

| Sinusoidally-sectioned Diffraction Grating | |
|---|---|
| | Relative to 0-th order Diffracted Light |
| ±1st order Diffracted Light | 100.0% |
| ±2nd order Diffracted Light | 15.5% |
| ±3rd order Diffracted Light | 1.0% |
| ±4-th order Diffracted Light | 0.0% |
| ±5-th order Diffracted Light | 0.0% |
| ±6-th order Diffracted Light | 0.0% |
| ±7-th order Diffracted Light | 0.0% |
| ±8-th order Diffracted Light | 0.0% |
| ±9-th order Diffracted Light | 0.0% |
| ±10-th order Diffracted Light | 0.0% |

As can readily be understood from Table 4, with the diffraction grating 5 having the grating projections each being of the generally rectangular cross-section, the intensity of the higher order diffracted light than +2nd order is high and, accordingly, the contrast of the image is reduced constituting a cause of the blurred image viewed.

On the contrary thereto, with the diffraction grating 5 having the grating projections each being of the generally sinusoidal cross-section, which member 5 is disposed perpendicular to the optical axis 8 as shown in FIG. 20, Table 5 shows that the ratio of the intensity of the higher order diffracted light than ±2nd order relative to the 0-th order diffracted light is low. The diffraction grating 5 having the grating projections 53 each being of the generally sinusoidal cross-section had the width a of 10 μm as measured along a mid-center line 9 of the sine wave, the pitch P of 20 μm and the optical height δ of 0.91π. With this diffraction grating 5, the reduction in contrast of the image can advantageously be minimized.

It is pointed out that, in the liquid crystal viewfinder employing the above described diffraction grating 5, no grating pattern of the diffraction grating 5 is viewable if the eye of a viewer looking through the viewfinder eyepiece is focused on the liquid crystal display panel 4, the grating pattern may be viewed if the viewer's eye is focused on the diffraction grating 5, thereby constituting a cause of reduction in image quality.

In view of this, the inventors of the present invention prepared diffraction gratings having different grating pitches and, as a result of observation of the image, it has been found that, if the grating pitch projected in the horizontal and vertical directions of the liquid crystal display panel or the color filter mounted on the liquid crystal display panel is chosen to be smaller than the pitch of the picture elements of the liquid crystal display panel or the color picture elements in identical color in the horizontal and vertical directions of the color filter, the grating pattern is hardly viewed, thereby to suppress the reduction in image quality even though the viewer's eye is focused on the diffraction grating. The reason for this appears that, while the pitch of the picture elements of the liquid crystal display panel or the pitch of the color picture elements in identical color of the color filter is chosen to such a minimum viewable value that the grating pattern may hardly be perceived visually, the grating pitch is chosen to be even smaller than that and, therefore, the viewability of the grating elements is further suppressed.

Figure 25:
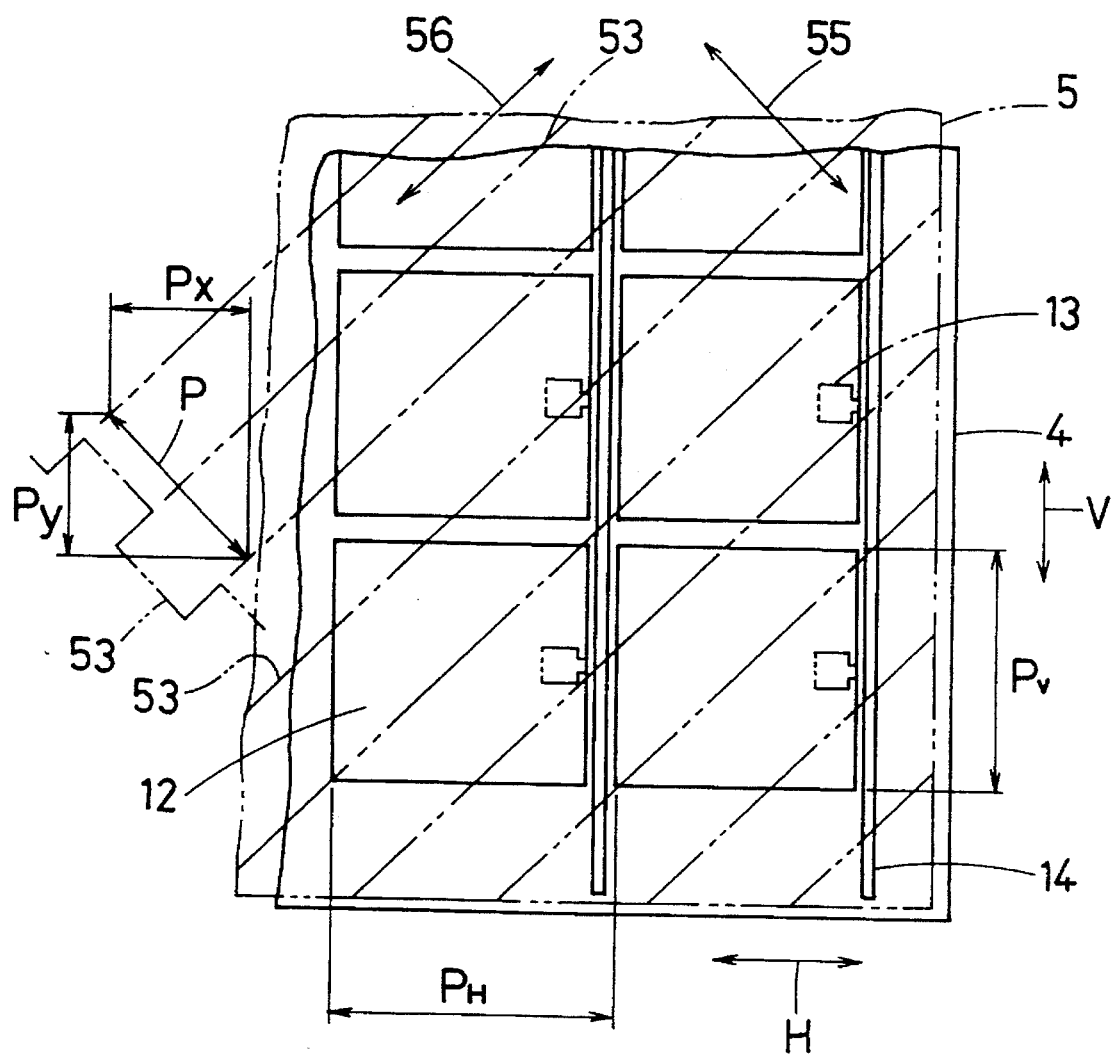
FIG. 25 is a fragmentary elevational view showing a relationship in position between the diffraction grating and the liquid crystal display panel as viewed in a direction conforming to an optical axis.
Figure 26:
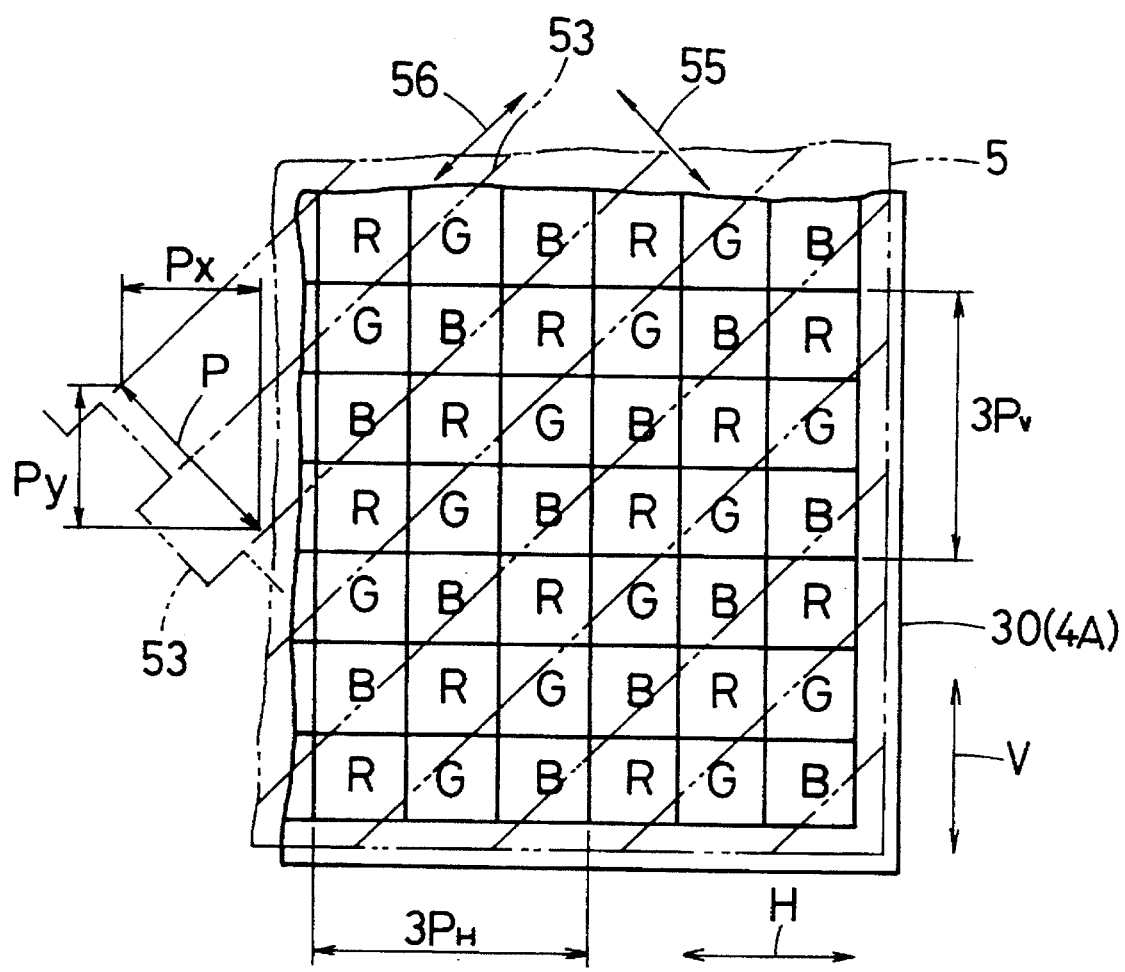
FIG. 26 is a fragmentary elevational view showing a different relationship in position between the diffraction grating and the liquid crystal display panel as viewed in a direction conforming to an optical axis.

Two embodiments developed on the basis of this finding are shown in FIG. 25 and FIG. 26, respectively.

Referring now to FIG. 25, the liquid crystal display panel 4 includes switching electrodes 13, which are non-linear elements, bus electrodes 14 through which an electric power is supplied to the switching electrodes 13, and others. Pixel electrodes 12 are arranged in both of the horizontal and vertical directions H and V. The diffraction grating 5 of a one-dimensional pattern shown in FIG. 19 is disposed parallel to a display surface of the liquid crystal display panel 4, with their grating projections 53 having a direction 56 of extension and a direction 55 of development which are inclined at 45 degrees relative to each other. Because of this, despite the fact that the diffraction grating is of a one-dimensional pattern, a blur is formed in any one of the horizontal and vertical directions H and V of the liquid crystal display panel 4 and, therefore, shades of the opaque pixel electrodes 12, the switching electrodes 13 and others are effectively reduced.

It is to be noted that, if the direction of development 55 of the projections 53 of the diffraction grating 5 is chosen to be parallel to the horizontal direction H of the liquid crystal display panel 4, the shades can be reduced along the horizontal direction H, but if the direction of development of the projections 53 of the diffraction grating 5 is chosen to be parallel to the vertical direction V of the liquid crystal display panel 4, the shades can be reduced along the vertical direction V.

The pixel electrodes 12, that is, the picture elements, of the liquid crystal display panel 4 are arranged at respective pitches $P_H$ and $P_V$ in the horizontal and vertical directions X and Y and the grating pitches Px and Py of the diffraction grating 5 projected in the horizontal and vertical directions H and V are chosen to be smaller than the pixel pitches $P_H$ and $P_V$ of the picture elements corresponding to the horizontal and vertical directions H and V, respectively ($Px \leq P_H$, $Py \leq P_V$).

FIG. 26 illustrates the embodiment applied to the color image display apparatus. Referring to this figure, a plurality of groups of color picture elements 32 of three primary colors are arranged in the horizontal and vertical directions H and V, and the grating pitches Px and Py of the diffraction grating 5 projected in the horizontal and vertical directions H and V are chosen to be smaller than the pitch $3P_H$ and $3P_V$ ($Px \leq 3P_H$, $Py \leq 3P_V$) of the color picture elements 32 of identical color in the horizontal and vertical directions H and V, respectively.

According to the embodiments of FIGS. 25 and 26, even if the viewer's eye is focused on the phase grating element 5, a pattern of the grating projections 53 which forms the grating elements can hardly be viewed thereby accomplishing a suppression of reduction in image quality.

In any one of the respective embodiments shown in FIGS. 25 and 26, the diffraction grating of a two-dimensional pattern such as shown in FIG. 3 can be employed and, in such case, the two directions 55 and 58 of development should match with the H-direction and V-direction shown in FIGS. 25 and 26, respectively.

Also, in any one of the respective embodiments shown in FIGS. 25 and 26, in place of the grating projections 53 each being of the generally rectangular cross-sectional shape, morphologically modulated grating elements of any other shape such as trapezoidal cross-section or sinusoidal cross-section or grating elements having a modulated index of refraction may also be employed.

Figure 27:
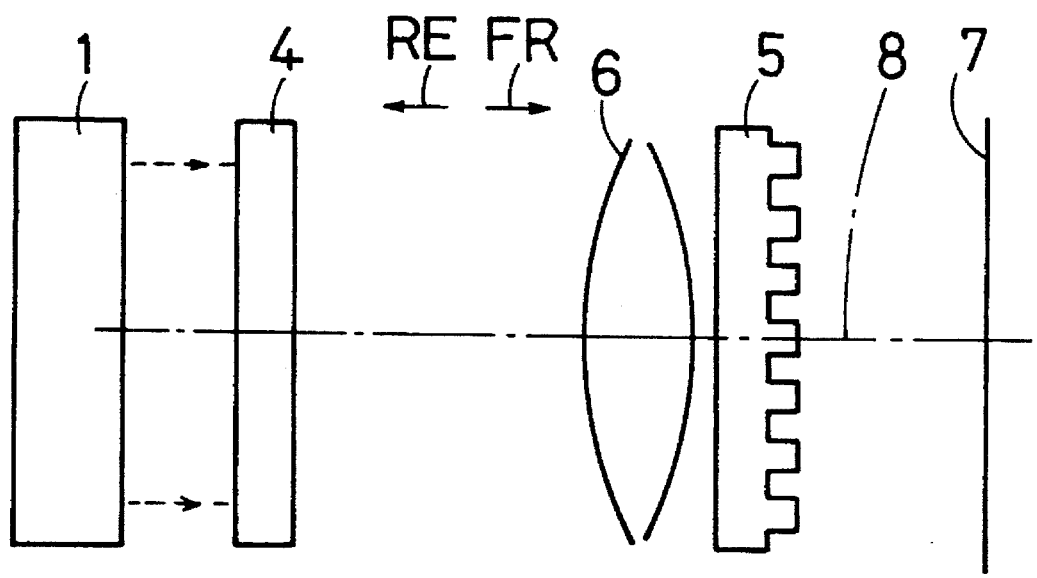
FIG. 27 is a schematic diagram showing the image display apparatus according to a further preferred embodiment of the present invention.

It is to be noted that, although in any one of the foregoing embodiments of the present invention the diffraction grating 5 has been described and shown as disposed between the liquid crystal display panel 4 and the lens group 6, the diffraction grating 6 may be disposed on the front side FR of the lens group 6, that is, between the lens group 6 and the viewer's eye, may be disposed as shown in FIG. 27. In any event, all that is necessary is to dispose the diffraction grating 5 at any location on the optical path through which the imagewise rays of light from the liquid crystal display panel 4 travel.

Figure 28:
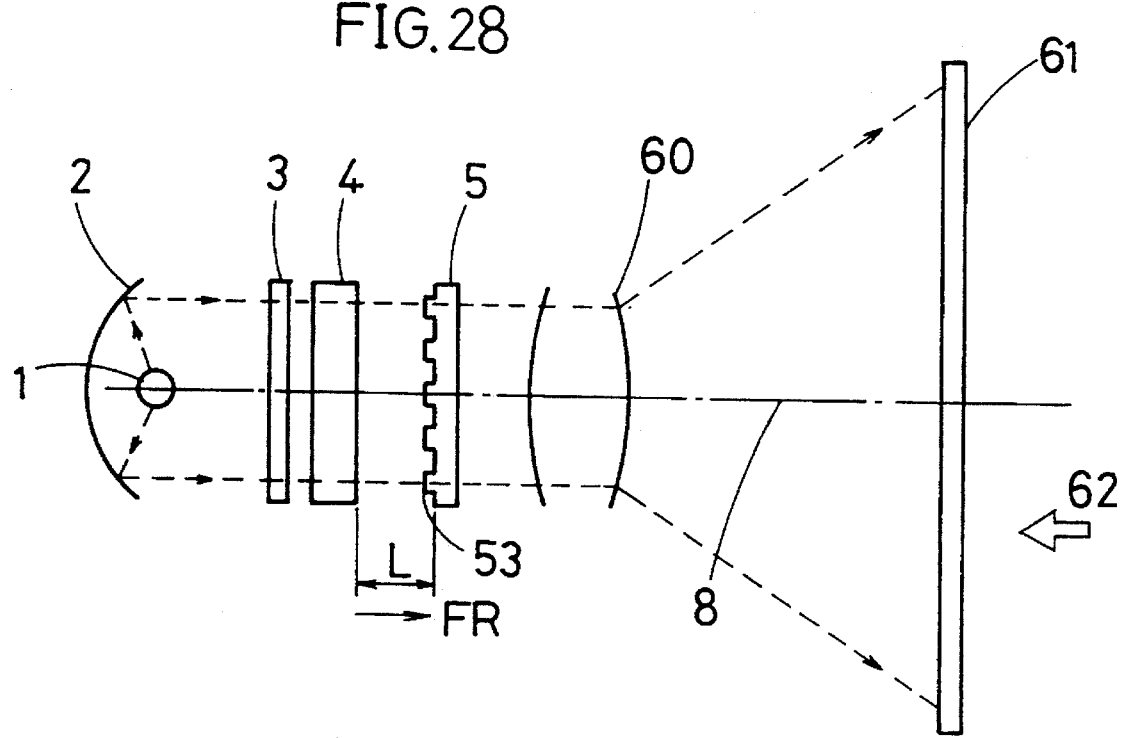
FIG. 28 is a schematic diagram showing the image display apparatus according to a still further preferred embodiment of the present invention.

The present invention may not be always applied to the viewfinder system such as referred to in the description of any one of the foregoing embodiments of the present invention, but may be applied to a projection-type projector such as shown in FIG. 28. Referring to FIG. 28, rays of light emitted from a light source 1 travel in part directly towards the liquid crystal display panel through a diffuser plate 3 and in part to the same liquid crystal display panel 4 through the diffuser plate 3 after having been converted by a reflector mirror 2 into parallel rays of light. The diffuser plate 3 serves to allow the rays of light from the light source 1 to impinge upon the liquid crystal display panel 4 uniformly over the entire surface thereof. Thus, the liquid crystal display panel 4 is illuminated from rear RE. Imagewise rays of light emerging from the liquid crystal display panel 4 subsequently pass through the diffraction grating 5 disposed on the front side FR of the liquid crystal display panel 4 and are then enlarged by a magnifying lens group 60 before they are projected on a transmission-type screen 61. A resultant image projected on the screen 61 can be viewed from front shown by the arrow 62.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although as shown in, for example, FIG. 1, the diffraction grating 5 has been described and shown as disposed with their grating projections 53, which forms the grating element, oriented perpendicular to the optical axis 8, the orientation of the grating elements may not be always limited to the right angles relative to the optical axis 8. Since the grating elements may be oriented in any suitable direction provided that the rays of light from the liquid crystal display panel 4 can satisfactorily be diffracted and, therefore, they may be oriented in any direction at an angle relative to the optical axis 8 other than the direction parallel to the optical axis 8.

Also, in describing any one of the foregoing embodiments of the present invention, reference has been made to the liquid crystal display panel 4 of active-matrix drive type having the switching electrodes 13. However, the present invention can be equally applied to any image display apparatus utilizing the liquid crystal display panel of static drive type. Particularly in the case of the liquid crystal display panel of static drive type, since the transparency of the electrodes employed therein is so high as to result in formation of dime shades of the electrodes. Accordingly, the application of the present invention to the liquid crystal display panel of static drive type results in a complete elimination of the appearance of the shades.

Accordingly, such changes and modifications are, unless they depart from the scope of the present invention as delivered from the claims annexed hereto, to be construed as included therein.

What is claimed is:

1. An image display apparatus which comprises:

a monochromatic image display device including a plurality of dot-shaped picture elements arranged in a two-dimensional pattern; and a diffraction grating disposed on an optical path through which imagewise rays of light emerging from the image display device travel, said diffraction grating having a spatial cut-off frequency which is chosen to lie between the Nyquist frequency and a sampling frequency, both being determined by an interval between the picture elements in the image display device.

2. The image display apparatus as claimed in claim 1, wherein said diffraction grating has grating elements each being in the form of a grating projection of a generally sinusoidal cross-sectional shape.

3. The image display apparatus as claimed in claim 1, wherein said image display device has a plurality of picture elements arranged in horizontal and vertical directions and wherein a grating pitch projected in any one of horizontal and vertical directions of the image display device is chosen to be smaller than the pitch of the picture elements in the horizontal and vertical directions of the image display device.

4. The image display apparatus as claimed in claim 1, wherein said image display device has a color filter including color picture elements arranged in horizontal and vertical directions and wherein a grating pitch projected in any one of horizontal and vertical directions of the color filter is chosen to be smaller than a pitch of the color picture elements in identical color in the horizontal and vertical directions of the color filter.

5. An image display apparatus which comprises:
a color image display device including a plurality of dot-shaped picture elements arranged in a two-dimensional pattern; and
a diffraction grating disposed on an optical path through which imagewise rays of light emerging from the color image display device travel, said diffraction grating having a spatial cut-off frequency which is chosen to lie between the Nyquist frequency, determined by an interval between color picture elements of identical color in a color filter employed in the color image display device, and a sampling frequency determined by an interval between the picture elements in the color image display device.

6. The image display apparatus as claimed in claim 5, wherein said diffraction grating has grating elements each being in the form of a grating projection of a generally sinusoidal cross-sectional shape.

7. The image display apparatus as claimed in claim 5, wherein said image display device has a plurality of picture elements arranged in horizontal and vertical directions and wherein a grating pitch projected in any one of horizontal and vertical directions of the image display device is chosen to be smaller than the pitch of the picture elements in the horizontal and vertical directions of the image display device.

8. The image display apparatus as claimed in claim 5, wherein said image display device has a color filter including color picture elements arranged in horizontal and vertical directions and wherein a grating pitch projected in any one of horizontal and vertical directions of the color filter is chosen to be smaller than a pitch of the color picture elements in identical color in the horizontal and vertical directions of the color filter.

* * * * *